United States Patent
Awadallah et al.

(10) Patent No.: US 10,290,125 B2
(45) Date of Patent: May 14, 2019

(54) CONSTRUCTING A GRAPH THAT FACILITATES PROVISION OF EXPLORATORY SUGGESTIONS

(71) Applicant: Microsoft Corporation, Redmond, WA (US)

(72) Inventors: Ahmed Hassan Awadallah, Redmond, WA (US); Ryen White, Woodinville, WA (US); Patrick Pantel, Bellevue, WA (US); Susan Dumais, Kirkland, WA (US); Yi-Min Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 47 days.

(21) Appl. No.: 14/322,258

(22) Filed: Jul. 2, 2014

(65) Prior Publication Data
US 2016/0005196 A1    Jan. 7, 2016

(51) Int. Cl.
*G06T 11/20* (2006.01)
*G06F 17/30* (2006.01)

(52) U.S. Cl.
CPC ........ *G06T 11/206* (2013.01); *G06F 17/3064* (2013.01)

(58) Field of Classification Search
CPC .......... G06F 17/30528; G06F 17/3053; G06F 17/30554; G06F 17/30672; G06F 17/30867; G06F 17/3064; G06T 11/206
See application file for complete search history.

(56) References Cited

U.S. PATENT DOCUMENTS

| | | | |
|---|---|---|---|
| 8,458,171 B2 | 6/2013 | Wu et al. | |
| 8,620,909 B1 | 12/2013 | Rennison | |
| 2009/0125502 A1 | 5/2009 | Ting et al. | |
| 2010/0198837 A1* | 8/2010 | Wu | G06F 17/30672 707/748 |
| 2011/0066629 A1 | 3/2011 | Escalante et al. | |
| 2012/0036123 A1* | 2/2012 | Hasan | G06F 17/30386 707/723 |
| 2012/0323899 A1* | 12/2012 | Ilyas | G06F 17/30867 707/723 |
| 2013/0144899 A1* | 6/2013 | Lee | G06F 17/30392 707/759 |
| 2013/0218866 A1 | 8/2013 | Qian et al. | |

OTHER PUBLICATIONS

"Response to the International Search Report & Written Opinion Received for PCT Patent Application No. PCT/US2015/038410", Filed Date: Dec. 28, 2015, 3 Pages.

(Continued)

*Primary Examiner* — Abderrahim Merouan
(74) *Attorney, Agent, or Firm* — Medley, Behrens & Lewis, LLC

(57) ABSTRACT

Various technologies pertaining to exploratory suggestions are described herein. A computer-implemented graph is constructed, where the graph includes nodes that are representative of aspects and edges that are representative of associations between aspects. An aspect is representative of a sub-topic of a topic or a sub-task of a task. The computer-implemented graph is learned based upon content of search logs, and is used to output exploratory suggestions, where a user is exploring a topic or attempting to complete a multi-step task.

20 Claims, 9 Drawing Sheets

(56) References Cited

OTHER PUBLICATIONS

Agichtein, et al., "Identifying "Best Bet" Web Search Results by Mining Past user Behavior", In Proceedings of the 12th ACM SIGKDD International Conference on Knowledge Discovery and Data Mining, Aug. 20, 2006, 7 pages.

Andre, et al., "From X-Rays to Silly Putty via Uranus: Serendipity and its Role in Web Search", In Proceedings of the SIGCHI Conference on Human Factors in Computing Systems, Apr. 4, 2009, 4 pages.

Baeza-Yates, et al., "Query Recommendation using Query Logs in Search Engines", In Proceedings of the International Conference on Current Trends in Database Technology, Mar. 14, 2004, 10 pages.

Bergsma, et al., "Learning Noun Phrase Query Segmentation", In Proceedings of the Joint Conference on Empirical Methods in Natural Language Processing and Computational Natural Language Learning, Jun. 2007, pp. 819-826.

Bilenko, et al., "Mining the Search Trails of Surfing Crowds: Identifying Relevant Websites from User Activity", In Proceedings of the 17th International Conference on World Wide Web, Apr. 21, 2008, 10 pages.

Boldi, et al., "Query Suggestions using Query-Flow Graphs", In Proceedings of the Workshop on Web Search Click Data, Feb. 9, 2009, 8 pages.

Bonchi, et al., "Efficient Query Recommendations in the Long Tail via Center-Piece Subgraphs", In Proceedings of the 35th International ACM SIGIR Conference on Research and Development in Information Retrieval, Aug. 12, 2012, 10 pages.

Bordino, et al., "Penguins in Sweaters, or Serendipitous Entity Search on User-Generated Content", In Proceedings of the 22nd ACM International Conference on Conference on Information & Knowledge Management, Oct. 27, 2013, pp. 109-118.

Bordino, et al., "From Machu_Picchu to "Rafting the Urubamba River": Anticipating Information Needs via the Entity-Query Graph", In Proceedings of the Sixth ACM International Conference on Web Search and Data Mining, Feb. 4, 2013, 10 pages.

Bouma, Gerlof, "Normalized (pointwise) Mutual Information in Collocation Extraction", In Proceedings of GSCL, Sep. 30, 2009, 11 pages.

Broder, Andrei, "A Taxonomy of Web Search", In Proceedings of ACM SIGIR Forum, vol. 36, Issue 2, Sep. 1, 2002, pp. 3-10.

Bron, et al., "A Subjunctive Exploratory Search Inter-Face to Support Media Studies Researchers", In Proceedings of the 35th International ACM SIGIR Conference on Research and Development in Information Retrieval, Aug. 12, 2012, pp. 425-434.

Cao, et al., "Towards Context-Aware Search by Learning a Very Large Variable Length Hidden Markov Model from Search Logs", In Proceedings of the 18th International Conference on World Wide Web, Apr. 20, 2009, pp. 191-200.

Carbonell, et al., "The Use of MMR, Diversity-Based Reranking for Reordering Documents and Producing Summaries", In Proceedings of the 21st Annual International ACM SIGIR Conference on Research and Development in Information Retrieval, Aug. 1, 1998, 2 pages.

Chalmers, et al., "The Order of Things: Activity-Centered Information Access", In Proceedings of the Seventh International Conference on World Wide Web, Apr. 1998, 13 pages.

Craswell, et al., "Random Walks on the Click Graph", In Proceedings of the 30th Annual International ACM SIGIR Conference on Research and Development in Information Retrieval, Jul. 23, 2007, 8 pages.

Czech, et al., "An Optimal Algorithm for Generating Minimal Perfect Hash Functions", In Journal of Information Processing Letters, vol. 43, Issue 5, Oct. 5, 1992, pp. 257-264.

Donato, et al., "Do You Want to Take Notes? Identifying Research Missions in Yahoo! Search Pad", In Proceedings of the 19th International Conference on World Wide Web, Apr. 26, 2010, pp. 321-330.

Friedman, et al., "Additive Logistic Regression: A Statistical View of Boosting", In Technical Report, Aug. 20, 1998, pp. 1-45.

Hagen, et al., "Query Segmentation Revisited", In Proceedings of the 20th International Conference on World Wide Web, Mar. 28, 2011, pp. 97-106.

Hassan, Ahmed, "Identifying Web Search Query Reformulation using Concept based Matching", in Proceedings of the Conference on Empirical Methods in Natural Language Processing, Oct. 2013, pp. 1000-1010.

Hassan, et al., "Task Tours: Helping Users Tackle Complex Search Tasks", In Proceedings of the 21st ACM International Conference on Information and Knowledge Management, Oct. 29, 2012, 5 pages.

Hassan, et al., "Struggling or Exploring? Disambiguating Long Search Sessions", In Proceedings of 7th ACM International Conference on Web Search and Data Mining, Feb. 24, 2014, pp. 53-62.

Jeh, et al. "Scaling Personalized Web Search", In Proceedings of the 12th international conference on World Wide Web, May 20, 2003, pp. 271-279.

Joachims, et al., "WebWatcher: A Tour Guide for the World Wide Web", In Proceedings of International Joint Conference on Artificial Intelligence, Aug. 1997, 6 pages.

Jones, et al., "Beyond the Session Timeout: Automatic Hierarchical Segmentation of Search Topics in Query Logs", In Proceedings of 17th ACM Conference on Information and Knowledge Management, Oct. 26, 2008, pp. 699-708.

Jones, et al., "Generating Query Substitutions", In Proceedings of the 15th International Conference on World Wide Web, May 23, 2006, pp. 387-396.

Lin, et al., "Active Objects: Actions for Entity-Centric Search", In Proceedings of the 21st International Conference on World Wide Web, Apr. 16, 2012, pp. 589-598.

Marchionini, Gary, "Exploratory Search: From Finding to Understanding", In Proceedings of Communications of the ACM, vol. 49, No. 4, Apr. 2006, pp. 41-46.

Mei, et al., "Query Suggestion Using Hitting Time", In Proceedings of the 17th ACM Conference on Information and Knowledge Management, Oct. 26, 2008, pp. 469-477.

Morris, et al., "SearchBar: A Search-Centric Web History for Task Resumption and Information Re-finding", In Proceedings of Conference on Human Factors in Computing Systems, Apr. 5, 2008, 10 pages.

Connor, et al., "TweetMotif: Exploratory Search and Topic Summarization for Twitter", In Proceedings of 4th International Conference on Weblogs and Social Media, May 23, 2010, 4 pages.

Olston, et al., "ScentTrails: Integrating Browsing and Searching on the Web", In Proceedings of ACM Transactions on Computer-Human Interaction, vol. 10, No. 3, Sep. 2003, pp. 177-197.

Pantel, et al., "Mining Entity Types from Query Logs via User Intent Modeling", In Proceedings of the 50th Annual Meeting of the Association for Computational Linguistics, Jul. 8, 2012, pp. 563-571.

Raman, et al., "Toward Whole-Session Relevance: Exploring Intrinsic Diversity in Web Search", In Proceedings of the 36th International ACM SIGIR Conference on Research and Development in Information Retrieval, Jul. 28, 2013, pp. 463-472.

Singla, et al., "Studying Trailfinding Algorithms for Enhanced Web Search", In Proceedings of the 33rd International ACM SIGIR Conference on Research and Development in Information Retrieval, Jul. 19, 2010, pp. 443-450.

Villa, et al., "An Aspectual Interface for Supporting Complex Search Tasks", In Proceedings of the 32nd International ACM SIGIR Conference on Research and Development in Information Retrieval, Jul. 19, 2009, pp. 379-386.

Voorhees, et al., "Overview of the Ninth Text Retrieval Conference (TREC-9)", In Proceedings of the Ninth Text Retrieval Conference, Nov. 13, 2000, 13 pages.

Wexelblat, et al., "Footprints: History-Rich Tools for Information Foraging", In Proceedings of the SIGCHI conference on Human Factors in Computing Systems, May 15, 1999, pp. 270-277.

White, et al., "Predicting Short-Term Interests Using Activity-Based Search Context", In Proceedings of the 19th ACM International Conference on Information and Knowledge Management, Oct. 26, 2010, pp. 1009-1018.

(56) References Cited

OTHER PUBLICATIONS

White, et al., "Assessing the Scenic Route: Measuring the Value of Search Trails in Web Logs", In Proceedings of the 33rd International ACM SIGIR Conference on Research and Development in Information Retrieval, Jul. 19, 2010, pp. 587-594.

Ziegler, et al., "Improving Recommendation Lists Through Topic Diversification", In Proceedings of the 14th international conference on World Wide Web, May 10, 2005, pp. 22-32.

Wu, et al., "Presenting Query Aspects to Support Exploratory Search", In Proceedings of the Eleventh Australasian Conference on User Interface, vol. 106, Jan. 1, 2010, pp. 23-32.

Angel, et al., "Efficient Diversity-Aware Search", In Proceedings of the ACM SIGMOD International Conference on Management of data, Jun. 12, 2011, pp. 781-792.

Santos, et al., "Exploiting Query Reformulations for Web Search Result Diversification", In Proceedings of the 19th international conference on World wide web, Apr. 26, 2010, pp. 881-890.

Bozzon, et al., "Liquid Query: Multi-Domain Exploratory Search on the Web", In Proceedings of the 19th international conference on World wide web, Apr. 26, 2010, pp. 161-170.

"International Search Report & Written Opinion Received for PCT Patent Application No. PCT/US2015/038410", dated Sep. 11, 2015, 11 Pages.

Awadallah, et al., "Supporting Complex Search Tasks", In Proceedings of the 23rd ACM International Conference on Conference on Information and Knowledge Management, Nov. 3, 2014, pp. 829-838.

Boldi, et al., "The Query-Flow Graph: Model and Applications", In Proceedings of the 17th ACM Conference on Information and Knowledge Management, Oct. 26, 2008, pp. 609-618.

Liao, et al., "Mining Concept Sequences from Large-Scale Search Logs for Context-Aware Query Suggestion", In ACM Transactions on Intelligent Systems and Technology, vol. 3, Issue 1, Article No. 17, Oct. 1, 2011, pp. 1-40.

"Written Opinion Received for PCT Patent Application No. PCT/US2015/038410", dated Apr. 13, 2016, 9 Pages.

"International Preliminary Report on Patentability for PCT Patent Application No. PCT/US2015/038410", dated Jul. 20, 2016, 10 Pages.

\* cited by examiner

CONSTRUCTING A GRAPH THAT FACILITATES PROVISION OF EXPLORATORY SUGGESTIONS

BACKGROUND

Search engines are a primary means by which people locate information on-line and complete search tasks. Conventionally, search engines are equipped with various technologies that are configured to assist users in locating information that matches their information retrieval (IR) intent. For example, search engines can be configured to provide query suggestions to users responsive to receipt of queries. These query suggestions are typically query disambiguations, where a search engine receives an ambiguous query and attempts to assist the user in refining the query. While query suggestions are often useful in connection with assisting the user in acquiring particular information, query suggestions are not particularly well-suited for assisting the user in completing a more complex search task.

SUMMARY

The following is a brief summary of subject matter that is described in greater detail herein. This summary is not intended to be limiting as to the scope of the claims.

A computing system is described herein. The computing system includes a processor and a memory that comprises a graph constructor system that is executed by the processor. The graph constructor system is configured to construct a computer-implemented graph based upon search logs of a search engine. The computer-implemented graph includes nodes that are representative of aspects, an aspect being one of a sub-task of a task or a sub-topic of a topic, each aspect defined by at least one query in the search logs. The computer-implemented graph also includes weighted edges that connect the nodes, a weight assigned to an edge indicative of a likelihood that a searcher will transition from a first aspect represented by a first node to a second aspect represented by a second node when completing the task or exploring the topic, the first node and the second node connected by the edge. The computer-implemented graph facilitates provision of a suggested query or content based upon a suggested query responsive to receipt of a query from the searcher.

DETAILED DESCRIPTION

Figure 4:
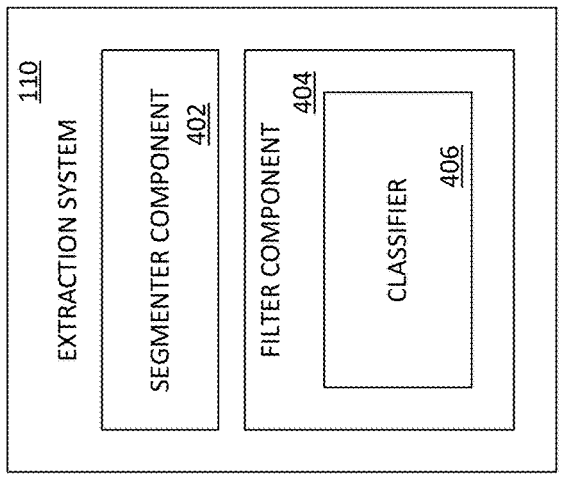
FIG. 4 is a functional block diagram of an exemplary extraction system that is configured to extract aspects from search logs.

Various technologies pertaining to assisting users explore topics and/or tasks are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

Figure 1:
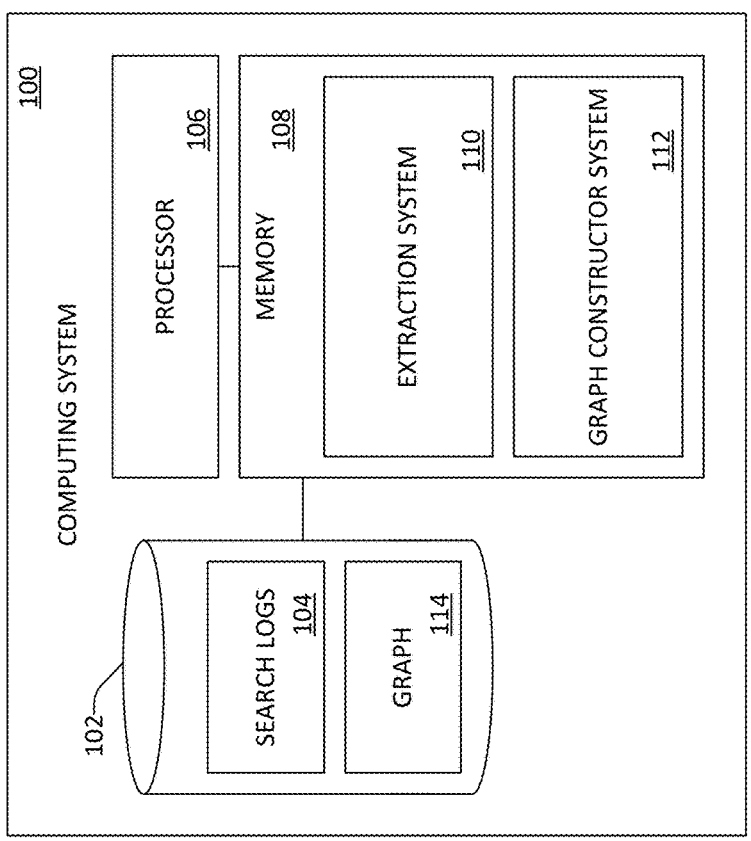
FIG. 1 is a functional block diagram of an exemplary computing system that facilitates constructing a computer-implemented graph, the computer-implemented graph configured to facilitate outputting exploratory suggestions.

With reference now to FIG. 1, an exemplary computing system 100 that facilitates construction of a computer-implemented graph is illustrated, wherein the computer-implemented graph facilitates output of exploratory suggestions (e.g., queries) responsive to receipt of queries from users of a search engine (searchers). As will be described in greater detail herein, in contrast to conventional approaches for suggesting queries (where suggested queries are potential disambiguations of a received query, query refiners, or query alternatives), the computing system 100 is configured to output queries that facilitate exploration about a topic and/or task (e.g., the queries output by the computing system 100 are configured to focus on alternatives within a search task). Still more specifically, a computer-implemented graph, which can be generated by the computing system 100, facilitates identification of exploratory suggestions that allow users to explore and accomplish multi-step search tasks. Exploration suggestions differ substantially from related searches offered by conventional web search engines. As indicated above, the main objective of related searches offered by conventional web search engines is to assist users refine their queries. In contrast, exploratory suggestions assist users in exploring new aspects of their current search task.

The computing system 100 includes a data store 102 that comprises search logs 104 of a search engine. The search logs 104 include multiple log entries. A log entry can include data that (anonymously) identifies a user, a query issued by the user, a timestamp that is indicative of when the query was issued, search results (if any) selected by the user, and dwell times on the search results selected by the user. A log entry can optionally include identities of search results presented to the user but not selected, an indication of whether a search engine results page (SERP) included an entity card or instant answer that satisfied the information need of the user, amongst other data.

The computing system 100 additionally includes a processor 106 and a memory 108 that comprises a plurality of systems that are executed by the processor 106. More specifically, the memory 108 includes an extraction system 110 that is configured to access the search logs 104 and identify exploratory search sessions based upon contents of the search logs 104. An exploratory search session can be defined as a search session where a user is, 1) engaged in learning and discovery (e.g., learning all aspects of a particular topic, comparing products, etc.); 2) browsing information on a topic or a person of interest (e.g., a celebrity, a sports team, etc.); or 3) undertaking a multistep search task (e.g., planning a trip). It can be ascertained that an exploratory search session is different from, for example, a navigational search session. In a navigational search session, the user is attempting to reach a very particular web page. An exploratory search session is also distinct from some types of informational search sessions. For instance, in some informational search sessions, users may wish to obtain a single answer (e.g., who was the first president of the United States). Moreover, it can be ascertained that an exploratory search session will include multiple queries that are respectively directed towards subtopics of a topic or subtasks of a task. For instance, a user exploring the topic "George Washington" may set forth queries about George Washington's time as a surveyor, a general, and a president. In another example, a user exploring the task of planning a vacation may set forth queries about renting vehicles, queries about activities at a particular destination, queries about purchase of plane tickets to the destination, etc. As will be readily ascertained from the description herein, the computing system 100 provides an improved experience (over conventional approaches) for a user who is performing an exploratory-type search, as the computing system 100 can provide query suggestions, content, advertisements, or the like that assist users in completing a multi-step task or learning about a multi-faceted topic.

The memory 108 also includes a graph constructor system 112 that constructs a computer-implemented graph 114 based upon the exploratory search sessions identified by the extraction system 110. The computer-implemented graph 114, when constructed by the graph constructor system 112, can be retained in the data store 102 (or another data repository).

Figure 2:
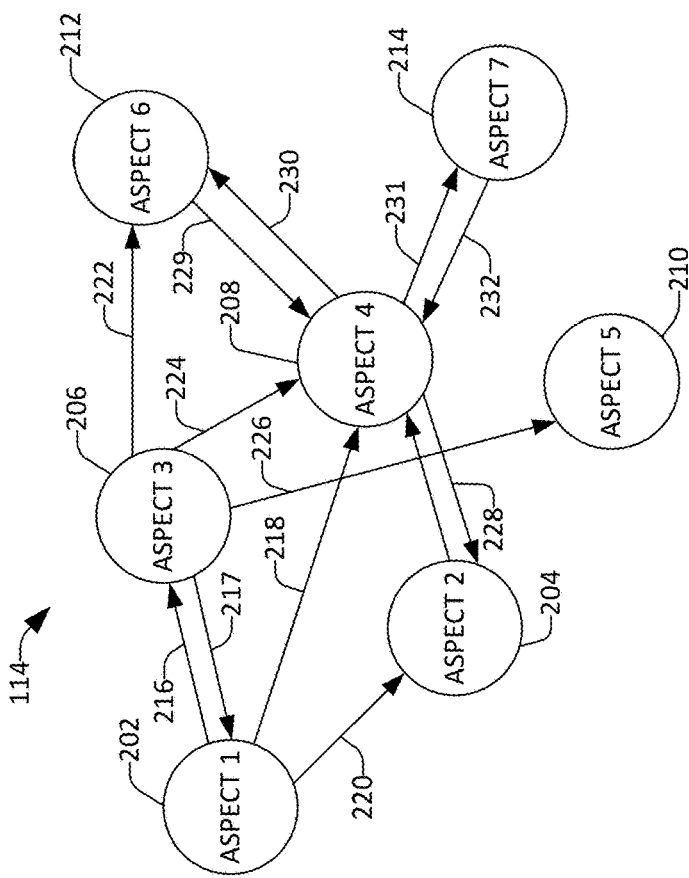
FIG. 2 illustrates an exemplary computer-implemented graph.

Referring to FIG. 2, an exemplary depiction of the computer-implemented graph 114 constructed by the graph constructor system 112 is illustrated. The computer-implemented graph 114 includes a plurality of nodes 202-214 that are respectively representative of a plurality of aspects. An aspect is a subtopic of a topic or a subtask of a task. Thus, for example, a task may be the planning of a trip; in such case, the first node 202 can be representative of the aspect of renting a car, the second node 204 can be representative of the aspect of renting a vacation home, the third node 206 can be representative of the aspect of locating eateries in a particular area, etc.

Figure 3:
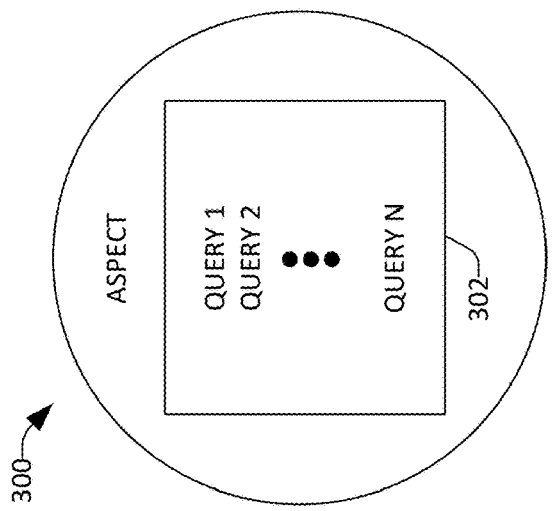
FIG. 3 illustrates an exemplary aspect that is represented in the computer-implemented graph.

Referring briefly to FIG. 3, an exemplary aspect 300 is illustrated. The aspect 300 can be defined by a plurality of queries 302 set forth by users of the search engine to obtain information about the subtopic represented by the aspect 300 or complete the subtask represented by the aspect 300. Thus, the queries 302 have been set forth by users in the exploratory search sessions identified by the extraction system 110. For example, when the aspect 300 is representative of the subtask of renting an automobile in Grand Cayman, the plurality of queries 302 may include "car rental at Grand Cayman", "Grand Cayman car rental", "Grand Cayman rental cars", etc. Further, the queries in the plurality of queries 302 can be ordered by frequency of issuance of the queries. In another example, the queries in the plurality of queries 302 can be ordered based upon their respective effectiveness in satisfying the information need of users (e.g., where subsequent to issuing the query, a satisfied query is one where the user selected a search result and dwelled on the search result for some threshold amount of time). The uppermost query in the plurality of queries 302 can be representative of the aspect 300 and can be surfaced as an exploratory suggestion, as will be described below. While the aspect 300 is shown as being defined by the plurality of queries 302, in some instances, an aspect may be defined by a single query.

Returning to FIG. 2, the computer-implemented graph 114 includes a plurality of directed edges 216-232. The directed edges 216-232 respectively couple pairs of nodes and can be weighted to indicate an amount of association between aspects represented by nodes. For example, the edge 216 directed from the first node 202 (representative of the first aspect) to the third node 206 (representative of the third aspect) can be weighted to indicate a likelihood that a searcher, who issued a query in the first aspect, will later issue a query in the third aspect. For instance, if the user issues the query "Grand Cayman flight tickets", which is included in the first aspect (e.g., at least partially defines the first aspect), then there is some likelihood that the user will issue the query "Grand Cayman vacation rentals", which may be included in the third aspect.

As referenced above, the computer-implemented graph 114 facilitates output of exploratory suggestions to the user responsive to the user issuing the query. Briefly, when the user of the search engine issues a query, the query can be compared with queries in aspects represented in the computer-implemented graph 114 (where an aspect is defined by its queries). When the query issued by the user is included in an aspect, the node in the computer-implemented graph 114 that represents the aspect is identified. Thereafter, another node in the computer-implemented graph can be identified based upon the weighted edges between nodes in the computer-implemented graph 114, wherein the other node represents another aspect. Responsive to identifying the other node, a query that at least partially defines the other aspect can be presented to the user as a suggested exploratory query. In another exemplary embodiment, rather than presenting the query, content retrievable based upon the query can be directly presented to the user. That is, content can be pre-fetched to assist the user in: 1) acquiring information about the topic of interest to the user (as evidenced by the issued query); or 2) acquiring information about the task of interest the user.

Now referring to FIG. 4, a functional block diagram of the extraction system 110 is illustrated. As indicated previously, the extraction system 110 is configured to identify exploratory search sessions in the search logs 104. To that end, the extraction system 110 can include a segmenter component 402 that segments the log entries in the search logs 104 into search sessions. A search session can be defined as a sequence of activities performed by a searcher when using a search engine, wherein each activity is within a threshold amount of time from an adjacent activity in the sequence. In other words, a search session can be continuous activity of the user with the search engine, without some threshold amount of idle time (e.g., 5 minutes, 10 minutes, 15 minutes, 30 minutes, etc.). The segmenter component 402 can segment the search logs 104 into search sessions based upon, for instance, user identities in log entries and timestamps of the log entries.

Responsive to the segmenter component 402 segmenting the search logs 104 into search sessions, the segmenter component 402 can further segment the search sessions into task sessions and topically coherent sub-sessions. A topically coherent session can be defined as a set of related information needs, resulting in one or more tasks and/or goals. Generally, a task session can be defined as at least a portion of a search session where the user has an atomic information need that results in the issuance of one or more queries. The segmenter component 402 can segment the search sessions into task sessions and topically coherent sessions based upon categories assigned to queries, categories assigned to search results viewed by the users responsive to issuing the queries, semantic analysis of the queries, etc. For example, to identify topically coherent sessions, the segmenter component 402 can identify overlapping categories assigned to queries issued by a user in a search session and/or overlapping categories of search results selected by the user in a search session. Task sessions and topically coherent sessions may be temporally interleaved, and tasks in a single topically coherent session also belong to the same session. It can be noted that the terms "tasks" and "goals" and the terms "topically coherent session" and "missions" have been used to describe these concepts.

As indicated previously, the extraction system 110 is configured to identify exploratory search sessions. The extraction system 110 can utilize a variety of techniques for identifying exploratory sessions, including identifying search sessions with at least a threshold number of queries (e.g., 3), identifying search sessions that have some threshold amount of topical cohesion amongst queries in the search sessions, etc. To assist in identifying exploratory search sessions, it may be desirable to disambiguate between exploratory search sessions and search sessions that are navigational in nature. For example, the extraction system 110 can include a filter component 404 that identifies navigational searches or struggling searches from the task sessions and topically coherent sessions. A navigational search is one where the user is trying to reach a particular site, while a struggling search is one where the user is struggling to locate information. The filter component 404 can remove some threshold number of most frequently issued queries that also have a low click entropy (click entropy below a threshold), a technique often used to identify navigational intent. In a non-limiting example, the filter component 404 can remove the 300, 500, 1,000, etc. most frequently issued queries that also have a low click entropy from being candidate exploratory sessions.

To identify and filter struggling search sessions, the filter component 404 can analyze a variety of features of a session output by the segmenter component 402. Exemplary features can include query features, query-transition features, click features, and topical features. Query features can include a number of queries in the search session, an amount of time between queries in the search session, average length of the queries in the search session, number of keywords in the queries in the search session, distribution and length of queries in the search session, etc. Query-transition features can include an average cosine similarity between queries in the search session, a number of terms added between consecutive queries in the search session, a number of terms deleted between consecutive queries in the search session, a number of substituted terms between consecutive queries in the search session, etc. Click features can include a number of clicks made by the user per query in the search session, an average dwell time on search results viewed by the user in the search session, a percentage of unique URL and domain clicks in the search session, etc. Topical features can include categories of documents selected by the user as assigned by the Open Directory project (ODP), count and entropy of such topics, etc.

The filter component 404 can include a classifier 406 that is trained to label a session as being struggling or not struggling. The classifier 406 can be trained based upon the features set forth above (query features, query-transition features, click features, and topical features) and search sessions labeled as being struggling or not struggling. Pursuant to an example, the classifier 406 may be a multiple additive regression tree (MART) classifier. Search sessions labeled as struggling by the classifier 406 can be removed from consideration as being candidate exploratory sessions. The remaining search sessions can be output as exploratory search sessions by the extraction system 110.

Figures 5, 6:
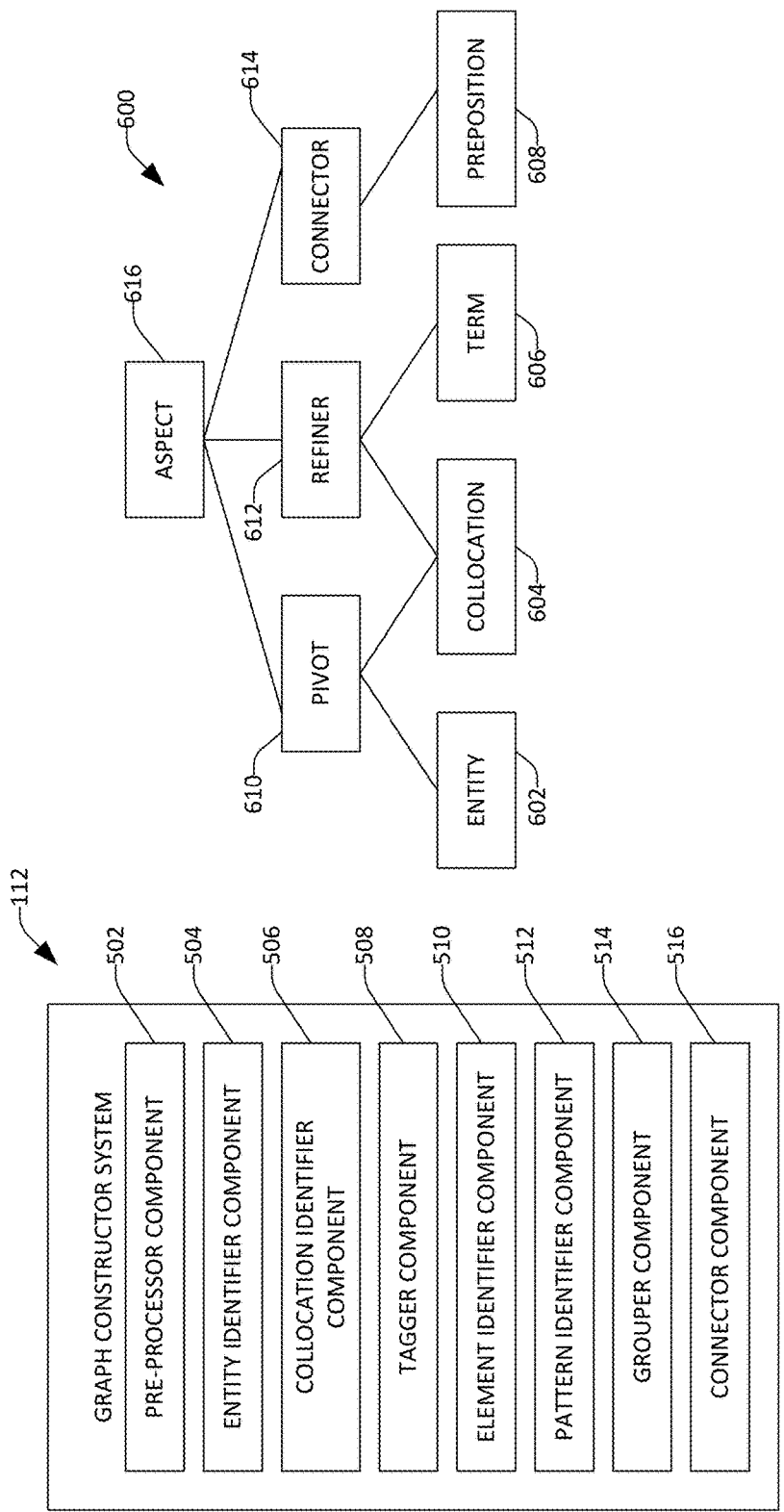
FIG. 5 is a functional block diagram of a graph constructor system that is configured to construct a computer-implemented graph that is configured to facilitate outputting exploratory suggestions.
FIG. 6 is a diagram that illustrates how an aspect can be identified.

Now referring to FIG. 5, a functional block diagram of the graph constructor system 112 is illustrated. As indicated previously, the graph constructor system 112 receives the exploratory search sessions output by the extraction system 110, and constructs the computer-implemented graph 114 based upon the exploratory search sessions. To that end, the graph constructor system 112 includes a pre-processor component 502 that extracts the queries from the exploratory search sessions and normalizes such queries. For instance, for each query, the pre-processor component 502 can lowercase text of the query, remove punctuation from the query, replace all runs of whitespace with a single space, and trim any leading or trailing spaces in the queries.

The graph constructor system 112 further includes an entity identifier component 504 that identifies entities in the queries and tags text spans in the queries that refer to the identified entities. It is to be understood that the entity identifier component 504 need not disambiguate the entity; rather, the entity identifier component 504 can assign a label that indicates that a text span is an entity. The entity identifier component 504 can utilize a variety of techniques for identifying entities in the queries. In an example, the entity identifier component 504 can utilize natural language processing (NLP) technologies to identify entities in the queries. In another example, the entity identifier component 504 can have access to a predefined dictionary that includes a list of entities. In yet another example, the entity identifier component 504 can identify entities based upon entities referenced in a Wiki page. In still more detail, the entities identified by the entity identifier component 504 can include people, places, companies, events, concepts, and famous dates. A lexicon can be constructed by extracting each lexical name associated with an entity in a knowledge base accessible to the entity identifier component 504, and the lexical name can be represented using any suitable key-value dictionary structure. For each query, the entity identifier component 504 can look up each possible n-gram in the perfect hash. The entity identifier component 504 can resolve nested matches by greedy admission using a left longest match heuristic. Many knowledge sources that can be used by the entity identifier component 504 to identify entities in queries represent ontological items such as /time/event and /business/employment_tenure, as well as complex value type (or reified) relations, such as /film/performance and /education/education. In order to filter these out, the entity identifier component 504 can identify lexical names in the queries, and a threshold number (e.g., 300) of most frequently matched types can be manually annotated according to whether they represented non-entity types (such as those referenced above) or entity types, e.g., /music/record_label, /aviation/airport, and /military/conflict. The entity identifier component 504 can filter out entities that are: 1) typed with a non-entity; and 2) typed with none of the entity-annotated types.

It is also known that lexical names may be ambiguous. Since the entity identifier component 504 is configured to tag queries with the presence of an entity, the entity identifier component 504 may only be concerned with names that are ambiguous in a non-entity sense. For example, the name "something" may be problematic, since it may refer to a famous song, as well as the very common non-entity pronoun. Highly ambiguous names can be filtered from the lexicon by building a binary ambiguity classifier trained on manually annotated names. A name can be labeled as ambiguous if it holds a non-entity sense, such as the name "something."

The graph constructor system 112 can further include a collocation identifier component 506 that is configured to identify collocations in the queries. A collocation (which is also referred to as a multi-term key word) is a sequence of words or terms that co-occur more often than would be expected by chance. For instance, in the query "cheap hotels in New York City," a bag of words representation would treat the query is a set of six words, in no particular order. Looking at the intent behind the query, it can be ascertained that the issuer of the query is searching for "cheap hotels" in "New York City", and that breaking these multi-term keywords into their constituent terms results in loss of semantic meaning.

The collocation identifier component 506 can utilize supervised or unsupervised learning techniques to identify collocations in queries. In an exemplary embodiment, the collocation identifier component 506 can use an unsupervised technique and can adopt the mutual information approach. A segmentation of a query into keywords (including collocations) can be obtained by the collocation identifier component 506 by computing the point-wise mutual information score for each pair of consecutive terms. More formally, for a query $q=\{q_1, q_2, \ldots, q_n\}$:

$$pmi(q_i, q_{i+1}) = -\log\frac{p(q_i, q_{i+1})}{p(q_i)p(q_{i+1})}, \quad (1)$$

where $p(q_i, q_{i+1})$ is the joint probability of occurrence of the bigram $q_i$, $q_{i+1}$ and $p(q_i)$ is the unigram occurrence probability of $q_i$. The collocation identifier component 506 can introduce a collocation break whenever the PMI values fall below a certain threshold τ. In an example, τ can be set to about 1.91. For instance, τ can be set to between 1.5 and 2.5.

The graph constructor system 502 can also include a tagger component 508 that is configured to assign tags to remaining tokens in queries (tokens not tagged as being entities and/or collocations). For example, for each remaining term in a query, the tagger component 508 can assign a "preposition" or "term" tag. The preposition tag refers to the linguistic construct preposition, while the term tag refers to any term not labeled as an entity, a collocation, or a preposition. Thus, each term in a query is labeled as being one of an entity, a collocation, a preposition, or a term.

The graph constructor system 112 further includes an element identifier component 510 that labels each term in a query as being one of a pivot, a refiner, or a connector, wherein the identifier component 510 performs such labeling based on the tags applied by the entity identifier component 504, the collocation identifier component 506, and the tagger component 508. A pivot can be defined as the central point of the query, and may be a concept that is well-defined and has been labeled as an entity or collocation (e.g., "New York City"). A refiner can be defined as a query constituent intended to characterize a precise distinction or subtlety in a query (e.g., "hotels").

To identify pivots and refiner in queries, the element identifier component 510 can utilize dependency parsing rules. For example, phrases of the form "NNX NNX", where NNX is a singular, plural, or proper noun, the pivot is the first noun. For phrases of the form "NNX IN NNX", where IN is a preposition, the second noun is the pivot. To find pivots and refiners in queries using the entity, collocation, term, and preposition tags, the element identifier component 510 can resolve nested entity and collocation matches. Nested matches can be resolved by greedy admission using a left longest match heuristic. For example, in the query "reviews for Company One Phone", the terms "Company One" and "Phone" can be identified as entities, and "Company One Phone" can be identified as a collocation. In this case, the element identifier component 510 can resolve the match by treating "Company One Phone" as a single concept, and labeling "Company One Phone" as a pivot. The information about the subsumed entities can be retained with the concept and the concept can be treated as an entity.

With reference to FIG. 6, a diagram 600 illustrates how the element identifier component 510 can identify pivots and refiners using the tags assigned to query terms by the entity identifier component 504, the collocation identifier component 506, and the tagger component 508. FIG. 6 includes a block 602 that represents the entity tag, a block 604 that represents the collocation tag, a block 606 that represent the term tag, and a block 608 that represents the preposition tag. The diagram 600 also includes a block 610 that represents a pivot tag, a block 612 that represents a refiner tag, and a block 614 that represents a connector tag. The diagram 600 also includes a block 616 that can represent an aspect. As shown in FIG. 6, a pivot 610 can be either an entity or a collocation. Allowing collocations to serve as pivots can increase the coverage of the graph constructor system 112, as it allows for coverage of concepts not typically labeled as entities (e.g., "fall wedding," "resume writing," etc.), as well as consecutive entities that are typically treated as a single entity (e.g., "Company One Phone"). Conversely, a refiner 612 can be a term or a collocation, in that it is intended to define a specific aspect of some entity (e.g., "cheap hotels"). Examples of queries and their corresponding lexical tags are set forth in Table 1 below. It can thus be ascertained that the element identifier component 510 can identify a pivot as being either an entity or a collocation, can identify a refiner as being either a collocation or a term, and can identify a connector as being a preposition.

TABLE 1

| Lexical Tags | Exemplary Query |
| --- | --- |
| Term Preposition Entity | reviews of phone |
| Term Preposition Entity | Attire for fall_wedding |
| Term Preposition Entity Entity | reviews of company phone |
| Collocation Preposition Entity Entity | user_reviews for phone |
| Collocation Preposition Collocation | center_pieces for fall_wedding |
| Collocation Preposition Entity Entity | user_reviews for company phone |
| Entity Term | phone reviews |
| Collocation Term | fall_wedding dresses |
| Entity Object Term | company tablet prices |
| Entity Location | tom_cruise latest movies |
| Collocation Collocation | fathers_day gift cards |
| Entity Entity Collocation | company phone protection_plan |

The graph constructor system 112 additionally includes a pattern identifier component 512 that identifies queries that have a predefined pattern from amongst a plurality of potential predefined patterns of "pivot", "refiner", "connector" tags. Exemplary predefined patterns include, but are not limited to: 1) refiner, connector, pivot (e.g., "cheap_hotels in new_york"); 2) pivot, refiner (e.g., "company_phone reviews"); and pivot (e.g., "george washington"). Since queries often lack syntactic structure, the pattern identifier component 512, in some cases, may also identify queries that have other patterns, such as refiner, pivot, when the pivot is an entity and is the only entity in the query. This pattern can also be allowed when the refiner is a question word (e.g., "What is adaptive radiation?"). The queries identified by the pattern identifier component 512 (e.g., queries that have one of the patterns referenced above) can be selected for inclusion in aspects, while the others can be discarded.

The graph constructor system 112 further comprises a grouper component 514 that can group the queries that fit the patterns referenced above into aspects. For example, since the same aspect can be represented by multiple queries, the grouper component 514 can group queries that represent the same aspect together. In an example, the grouper component 514 can utilize a query similarity function and apply such function to all pairs of queries that match the patterns referenced above, followed by clustering, to obtain the aspects that are to be included in the computer-implemented 114. In another approach, metadata about the queries (refiner and pivot tags, entity tags, etc.) can be used by the grouper component 514 when grouping queries into aspects. For instance, the grouper component 514 can perform the following steps to group queries into aspects. First, the grouper component 514 can assign identifiers to common entities. For example, the grouper component 514 can determine that a query includes the sequence of terms "New York City", which refers to the entity New York City. The entity New York City can have an identifier assigned thereto, such that "New York City" in the query can be replaced with the identifier. Another query may include the term "NYC", which also refers to the entity New York City. The term "NYC" in the another query can be replaced with the identifier for the entity New York City reference above, which allows for matching of different surface forms of the same entity.

The grouper component 514 can thereafter normalize the syntactic structure of all queries by transforming all patterns of the form refiner-connector-pivot to pivot-refiner. For instance, the grouper component 514 can transform the query "hotels in New York City" to "New York City hotels." Further, the grouper component 514 can match two refiners for queries with the same pivot if they: 1) have the same lemma (lemmatization is the process of reducing an inflected spelling to its lexical root or lemma form); or 2) have a normalized edit distance of less than some threshold (e.g., 0.2). This allows for capture of spelling mistakes and spelling variations. Applying these steps allows the grouper component 514 to group queries such as "hotels in New York City", "hotels in NYC", "NYC hotel", "NYC hotls", etc. into a single query group representing a single aspect. The output of the grouper component 514 is a plurality of aspects, each including at least one query.

The graph constructor system 112 includes a connector component 516 that computes associations between aspects. For instance, as indicated previously, the resultant computer-implemented graph 114 is to facilitate assisting a user explore by recommending related and interesting aspects with respect to a currently issued query. Thus, a desirable list of recommendations will include different aspects that are related to the current query (aspect). Based upon associations computed by the connector component 516, the graph constructor system 112 can construct a computer-implemented graph G=(A,E,w) (the graph 114), where A is the set of all aspects output by the grouper component 514; E=A×A is the set of possible associated aspects; and w: E→[0 . . . 1] is a function that assigns to every pair of aspects (i,j) a weight w(i,j) representing their association strength.

To measure the association between pairs of aspects, the connector component 516 can utilize the normalized point-wise mutual information (NPMI). The PMI of any two discrete events x and y quantifies their degree of association by the discrepancy between the probability of their coincidence given their joint distribution and the probability of their coincidence given only their individual distributions, assuming independence. The PMI value is zero if the two variables are independent. Positive values of PMI indicate positive association, while negative values indicate negative association. Since PMI can take arbitrary positive or negative values, it can be normalized into NPMI as follows.

$$npmi(x, y) = -\log\frac{p(x, y)}{p(x)p(y)} /\log p(x, y). \quad (2)$$

To compute the PMI value, the connector component 516 can determine when two aspects have co-occurred. Co-occurrence can be defined when the same user issues queries belonging to different aspects within some threshold amount of time (e.g., 48 hours). Pairs that co-occurred less than some threshold number of times (e.g., 10 times) can be discarded unless they share the same pivot. The computed associations can be employed to determine edges between aspects and weights of such edges.

Figure 7:
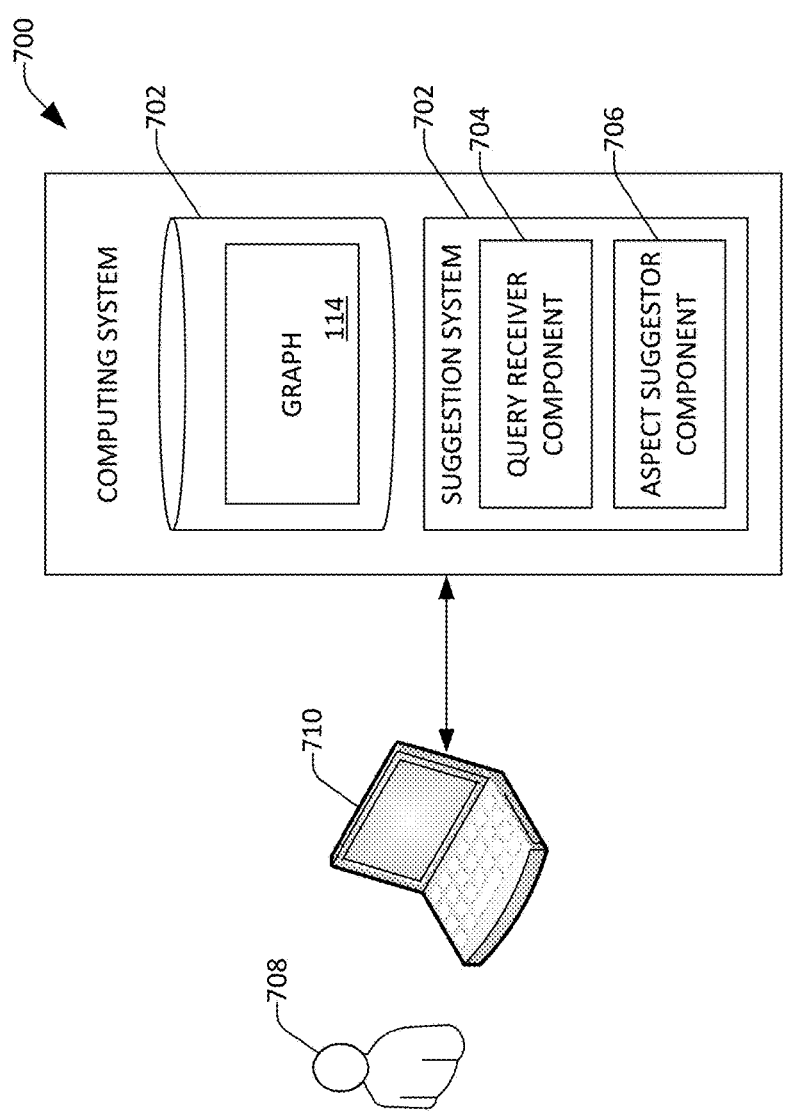
FIG. 7 is a functional block diagram of an exemplary system that facilitates suggesting an aspect responsive to receipt of a query.

Now referring to FIG. 7, an exemplary computing system 700 that facilitates outputting suggested exploratory queries (or content pre-fetched based upon exploratory queries) is illustrated. The computing system 700 includes a data store 702 that comprises the computer-implemented graph 114. The computing system 700 further comprises a suggestion system 702 that is configured to suggest an aspect responsive to receipt of a query. The suggestion system 702 includes a query receiver component 704 that is configured to receive a query and an aspect suggestor component 706 that is configured to suggest an aspect responsive to the query receiver component 704 receiving the query.

In operation, a user 708 of a client computing device 710 can issue a query to a search engine. The suggestion system 702 receives the query and compares the query with queries that defined aspects in the computer-implemented graph 114. When the query issued by the user 708 is also included in the computer-implemented graph 114, the aspect suggestor component 706 can identify the aspect that includes the issued query and can suggest another aspect to the user 708 based upon the identified aspect. The aspect suggestor component 706 can utilize a variety of approaches to suggest aspects to the user 708. For instance, once the aspect that includes the query issued by the user 708 is identified, a threshold number of most highly associated aspects can be identified by the aspect suggestor component 706 and output as suggestions (e.g., where the suggestions can be the most frequently issued queries respectively included in the aspects).

In another example, the aspect suggestor component 706 can employ a random walk approach to suggest aspects. For instance, the aspect suggestor component 706 can simulate a random traveler walking along the computer-implemented graph 114. Starting from one i (e.g., a user query that is included in one of the aspects); it either stays at i with probability β or moves to another adjacent node with probability 1−β. When it moves to an adjacent node, it selects a node j with probability $P_{ij}$ that is proportional to the weight of the edge connecting i and j.

The transition probabilities $P_{t+1|t}(j|i)$ from i to j can be defined by normalizing the weights of the edges connected to the aspect:

$$P_{t+1|t}(j|i) = \frac{W_{ij}}{\sum_k W_{ik}}, \quad (3)$$

where k represents all nodes in the neighborhood of i. $P_{t2|t1}(j|i)$ denotes the transition probability from node i at step $t_1$ to node j at step $t_2$. It can be noted that neither the weights $W_{ij}$ nor the transition probabilities are symmetric (e.g., the edges in the graph 114 are directional).

Self-transition loops can be introduced to reinforce the importance of the starting node and to slow the diffusion of the random walk to other nodes. In an example, the self-loop probability can be between 0.8 and 0.95. The aspect suggestor component 706 can stop the random walk after a maximum of z iterations (e.g., 30 iterations) or when the norm of the difference between two successive iterations is less than a threshold number (e.g., $10^{-6}$). The aspect suggestor component 706 can rank the recommended aspects based on the stationary distribution of the random walk.

Before applying the random walk, the aspect suggestor component 706 can remove any edge if its weight is less than some number (0.2). Further, the aspect suggestor component 706 can also remove nodes that have no connections to any other nodes. Further, the aspect suggestor component 706 can perform a re-ranking to ensure that diverse suggestions are provided the user 708. To reduce redundancy in the recommended list while maintaining relevance, the aspect suggestor component 706 can use a maximal marginal relevance (MMR)-like function that tries to promote relevant novelty instead of just relevance. To measure relevant novelty, the aspect suggestor component 706 can measure relevance and novelty independently and then rank recommendations based on a linear combination of both. Formally, the aspect suggestor component 706 can attempt to maximize the following function.

$$\text{Score}(s_i) = \lambda \text{Relev}(s_i, Q) - (1-\lambda)\max_{j<i} \text{Sim}(s_i, s_j), \quad (4)$$

where Q is the original query, S={$s_i, \ldots, s_n$} is the list of suggestions, Relev($s_i$,Q) is the stationary distribution score described above normalized to be $\epsilon[0,1]$, and Sim($s_i,s_j$) is a function to measure the similarity between different aspects. For instance, Sim($s_i,s_j$) can be defined as the cosine similarity between word text frequency representations of x and y. Finally, $\lambda \epsilon[0,1]$ is a parameter to control the trade-off between aspect relevance and aspect diversity. For example, λ can be set to 0.5.

While the system 700 has been described as being well-suited for providing exploratory query suggestions, it is to be understood that the system 700 can be configured to output other types of suggestions as well. In an example, the aspect output by the suggestion system 702 can be an electronic communications, such as advertisement. Thus, for example, if the user 708 sets forth the query "rental cars cayman islands", the suggestion system 702 can identify and provide an advertisement for hotels in the Cayman Islands. Likewise, the suggestion system 708 can suggest aspects to prospective advertisers—thus, continuing with the exemplary query mentioned above, the suggestion system 702 can output the aspect (bid terms) "hotels cayman islands" to an auction system, where advertisers can bid on such terms.

Figure 8:
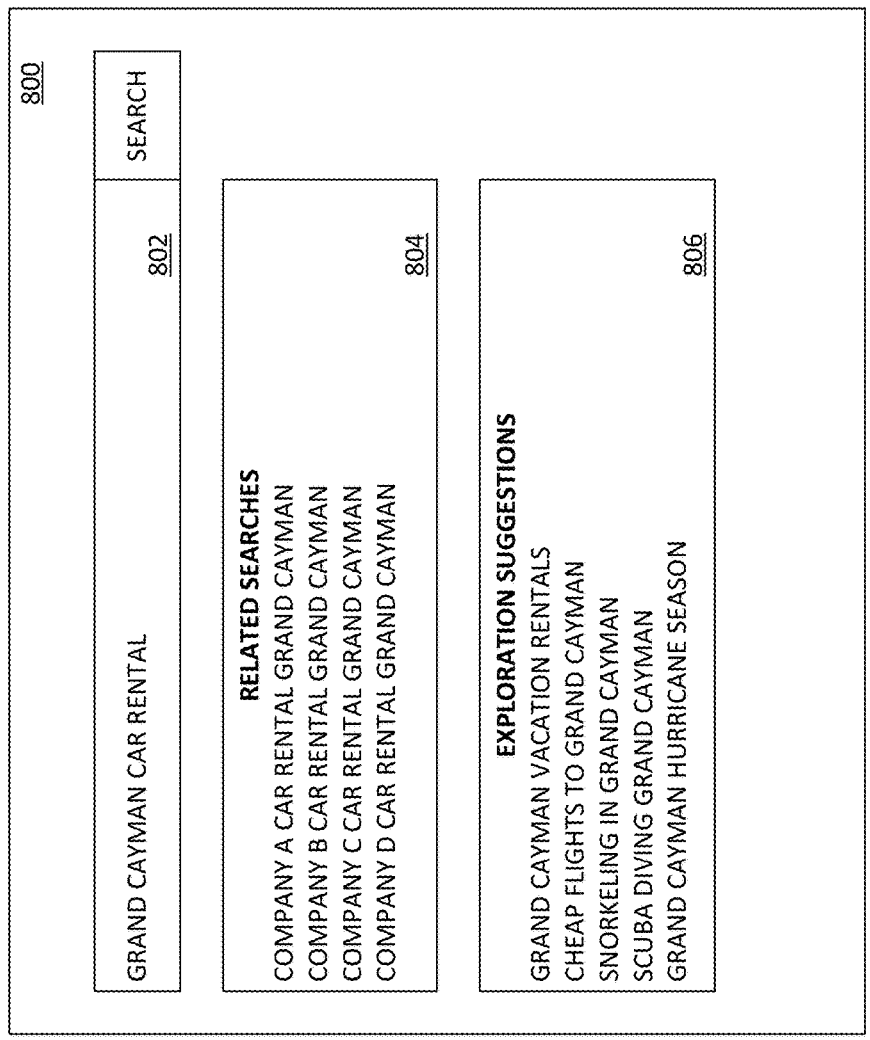
FIG. 8 is a graphical user interface that includes suggested query disambiguations as well as exploratory suggestions.

FIG. 8 represents an exemplary graphical user interface 800 that may be presented to the user 708 responsive to the user 708 issuing the query "Grand Cayman car rental". The graphical user interface 800 includes a query field 802, where the user 708 can enter the query. The graphical user interface 800 also includes a related search field 804 that includes suggestions that may help the user 708 complete the sub-task that corresponds to the query issued by the user 708. For example, selection of one of the queries in the related searches field 804 may cause a particular search results page to be presented to the user 708, where results are well-suited to allow the user to book a rental car.

The graphical user interface 800 also includes an exploration suggestions field 806 that can include exploratory suggestions output by the aspect suggestor component 706. For instance, the exploratory suggestions can include "Grand Cayman vacation rentals", "cheap flights to Grand Cayman", "Snorkeling in Grand Cayman", and the like. These suggestions may assist the user in exploring other activities in Grand Cayman, wherein selection of one of the exploration suggestions can cause a search engine to perform an updated search.

Figure 9:
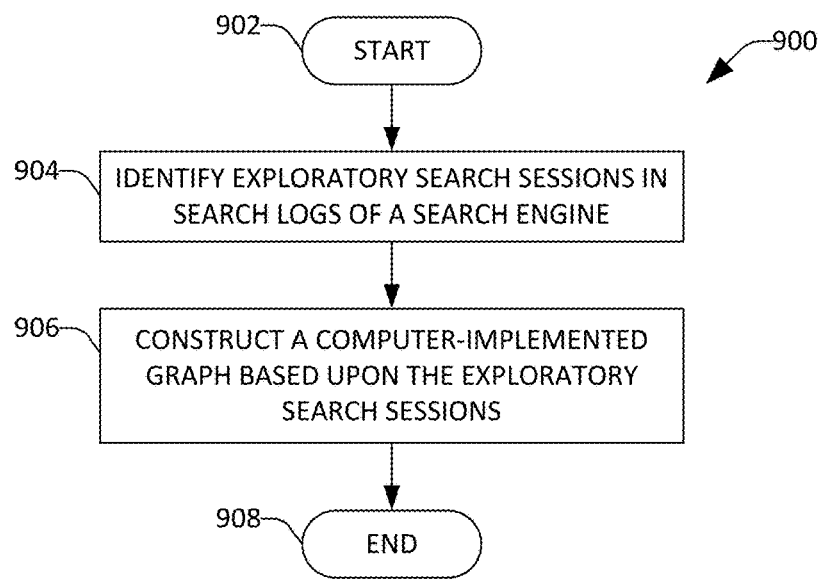
FIG. 9 is a flow diagram illustrating an exemplary methodology for constructing a computer-implemented graph.
Figure 10:
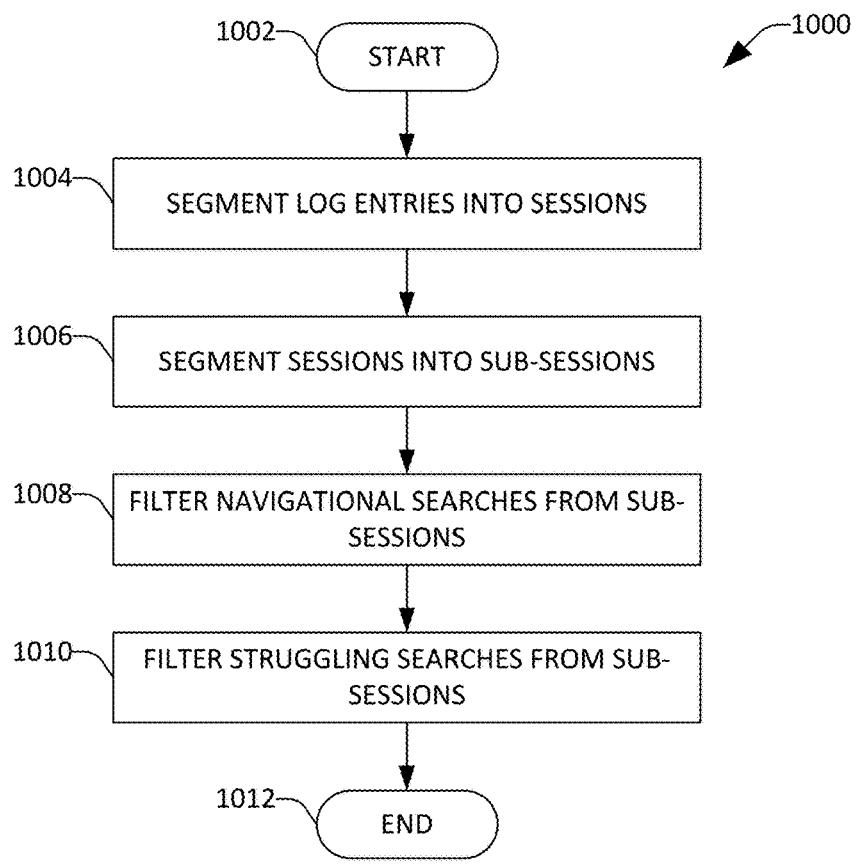
FIG. 10 is a flow diagram illustrating an exemplary methodology for extracting exploratory searches from search logs of a search engine.
Figure 11:
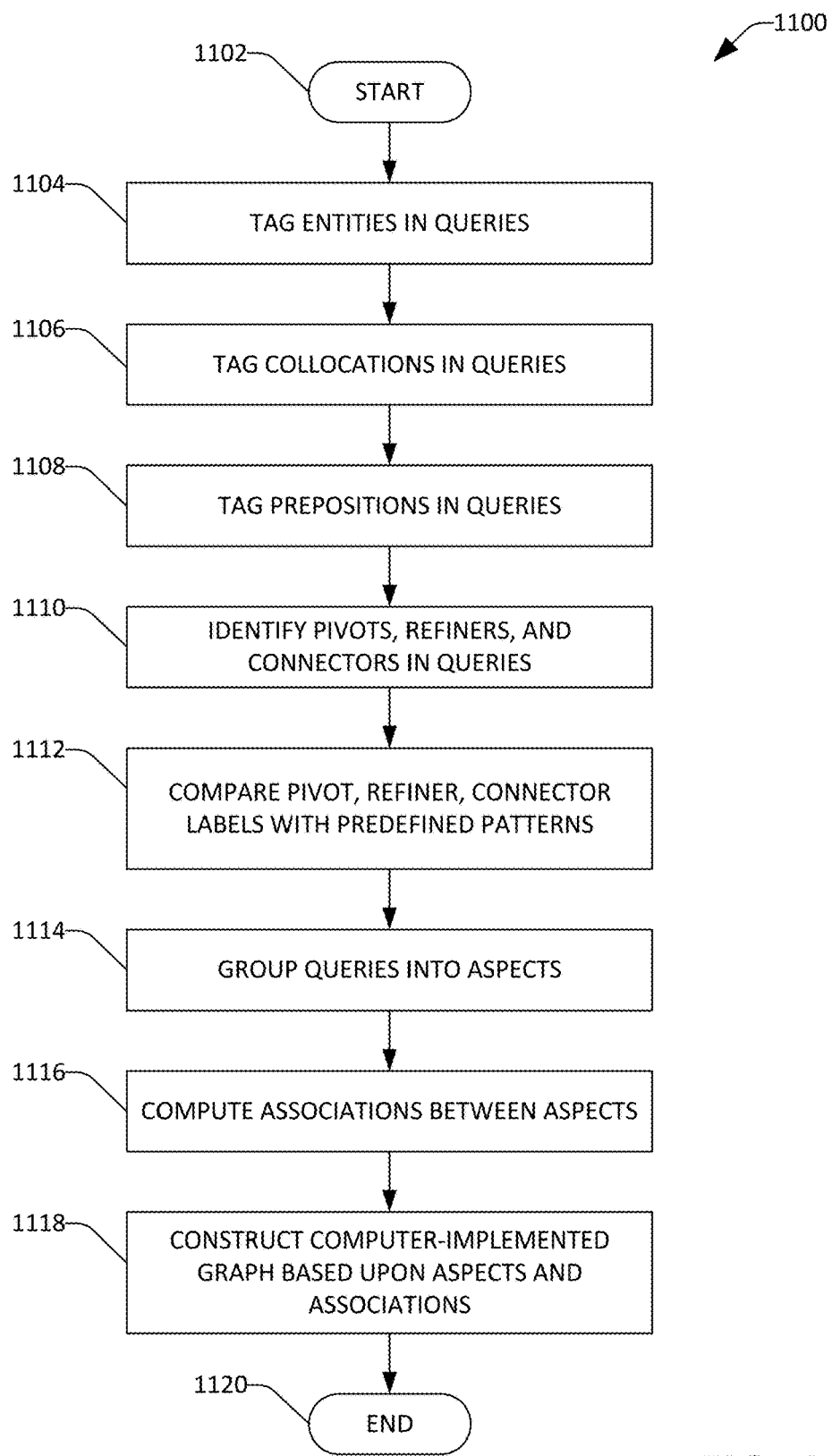
FIG. 11 is a flow diagram illustrating an exemplary methodology for constructing a computer-implemented graph.

FIGS. 9-11 illustrate exemplary methodologies relating to provision of exploratory suggestions to users. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference now to FIG. 9, an exemplary methodology 900 that facilitates constructing the computer-implemented graph 114 is illustrated. The methodology 900 starts at 902, and at 904 exploratory search sessions are identified in search logs of a search engine. At 906, a computer-implemented graph is constructed based upon the exploratory search sessions identified at 904. As described above, the computer-implemented graph includes nodes that are representative of aspects and edges that are representative of relationships (associations) between the aspects. The methodology 900 completes at 908.

With reference now to FIG. 10, an exemplary methodology 1000 that facilitates identifying exploratory search sessions in search logs of a search engine (act 904 of the methodology 900) is illustrated. The methodology 1000 starts at 1002, and at 1004 log entries are segmented into search sessions. At 1006, the search sessions are segmented into sub-sessions. Specifically, the sub-sessions can be topically coherent sessions or sessions related to completion of a search task. At 1008, navigational searches are filtered from the sub-sessions. At 1010, struggling searches are filtered from the remaining sub-sessions. The subsequent remaining sub-sessions can be identified as exploratory search sessions. The methodology 1000 completes at 1012.

Now referring to FIG. 11, an exemplary methodology 1100 that facilitates constructing the computer-implemented graph 114 is illustrated (act 906 of the methodology 900). At 1104, entities in queries of the exploratory search sessions are tagged as being entities. That is, a term or sequence of terms can be tagged as being an entity. At 1106, collocations in the queries are tagged. It can be understood that an entity may be a collocation. Accordingly, terms may be tagged as being both entities and collocations. At 1108, prepositions in the queries are tagged. Terms in the query not identified as entities, collocations, or prepositions, can be tagged as terms. At 1110, pivots, refiners, and collocations in the queries are identified based upon predefined patterns, dependency parsing rules, and the entity, collocation, term, and preposition tags. At 1112, the pivot, refiner, connector labels in the queries are compared with the predefined patterns referenced above. The queries that conform to the one of the predefined patterns are retained, while the others are discarded. At 1114, the remaining queries are grouped into aspects. For instance, a pairwise similarity analysis can be performed to do the grouping, or metadata associated with the queries can be utilized to perform the grouping. At 1116, values that are indicative of associations between the aspects are computed, and at 1118 the computer-implemented graph is constructed based upon the aspects created at 1114 and the associations computed at 1116. The methodology 1100 completes at 1120.

Various examples are now set forth.

EXAMPLE 1

A computing system, comprising: a processor; and a memory that comprises a graph constructor system that is executed by the processor, the graph constructor system configured to: construct a computer-implemented graph based upon search logs of a search engine, the computer-implemented graph comprises: nodes that are representative of aspects, an aspect being one of a sub-task of a task or a sub-topic of a topic, each aspect defined by at least one query in the search logs; and weighted edges that connect the nodes, a weight assigned to an edge indicative of a likelihood that a searcher will transition from a first aspect represented by a first node to a second aspect represented by a second node when completing the task or exploring the topic, the first node and the second node connected by the edge, the computer-implemented graph facilitates provision of a suggested query or content based upon a suggested query responsive to receipt of a query from the searcher.

EXAMPLE 2

The computing system according to example 1, the memory further comprises an extraction system that is configured to identify exploratory search sessions in the search logs, the exploratory search sessions being search sessions where searchers are exploring topics that include sub-topics or completing tasks that include sub-tasks, the graph constructor system configured to construct the computer-implemented graph based upon the exploratory search sessions identified by the extraction system.

EXAMPLE 3

The computing system according to any of examples 1-2, the graph constructor system comprises an identifier component that is configured to identify entities in queries of the search logs, the graph constructor system configured to construct the computer-implemented graph based upon the entities identified by the identifier component.

EXAMPLE 4

The computing system according to examples 1-3, the graph constructor system comprises a collocation identifier component that is configured to identify term collocations in queries in the search logs, a term collocation being a sequence of terms that occur more often than would be expected by chance, the graph constructor system configured to construct the computer-implemented graph based upon the term collocations identified by the collocation identifier component.

EXAMPLE 5

The computing system according to any of examples 1-4, the graph constructor system comprises a tagger component that is configured to identify prepositions in queries in the search logs, the graph constructor system configured to construct the computer-implemented graph based upon the prepositions identified by the queries in the search logs.

EXAMPLE 6

The computing system according to any of examples 1-5, the graph constructor system comprises a pattern identifier component that is configured to identify term patterns in queries in the search logs, the graph constructor system configured to construct the computer-implemented graph based upon the patterns.

EXAMPLE 7

The computing system according to any of examples 1-6, the graph constructor system comprises a grouper component that is configured to group queries in the search logs into a plurality of query groups, each query group represents a respective aspect.

EXAMPLE 8

The computing system according to any of examples 1-7, the graph constructor system comprises a connector component that is configured to compute weights to assign to the edges in the graph based upon the search logs, the graph constructor system configured to construct the computer-implemented graph based upon the weights.

EXAMPLE 9

The computing system according to any of examples 1-8, at least one aspect defined by multiple queries, the suggested query being a most frequently issued query in the at least one aspect.

EXAMPLE 10

The computing system according to any of examples 1-9, the memory further comprises a suggestion system that is configured to output at least one suggested aspect responsive to receipt of a query, the suggestion system configured to perform a comparison between the query and aspects represented by the computer-implemented graph and identify an aspect based upon the comparison, the suggestion component configured to output the at least one suggested aspect based upon the identified aspect.

EXAMPLE 11

The computing system according to example 10, the suggestion system configured to identify the at least one suggested aspect based upon a weight of a connection between the identified aspect and the at least one suggested aspect.

EXAMPLE 12

A method for constructing a computer-implemented graph that facilitates suggesting exploratory queries to users, the method comprising: identifying exploratory search sessions in search logs of a search engine, an exploratory search session comprising a plurality of queries set forth to obtain information about topics or to complete tasks; based upon the identifying of the exploratory search sessions, constructing a computer-implemented graph, wherein constructing the computer-implemented graph comprises: identifying nodes that are representative of aspects, an aspect being a sub-topic of a topic or a sub-task of a task, an aspect defined by at least one query in the exploratory search logs; and coupling nodes with edges that are representative of relationships between the aspects, an edge that connects a first node with a second node representative of a likelihood that a searcher, when provided with a first aspect represented by the first node, will choose to perform a second aspect represented by the second node.

EXAMPLE 13

The method according to example 12, wherein identifying the exploratory search sessions comprises: identifying search sessions with at least a predefined threshold number of queries therein; and identifying the exploratory search sessions based upon identifying the search sessions with the at least the predefined threshold number of queries therein.

EXAMPLE 14

The method according to any of examples 12-13, wherein identifying the exploratory search sessions further comprises: identifying that queries in search sessions have a threshold amount of topical cohesion; and identifying the exploratory search sessions based upon the identifying that the queries in the search sessions have the threshold amount of topical cohesion.

EXAMPLE 15

The method according to any of examples 12-14, wherein constructing the computer-implemented graph comprises: identifying a pivot in a query in an exploratory search session, the pivot being an entity or a term collocation, the term collocation being a sequence of terms that occur more often than would be expected by chance; identifying a refiner in the query, the refiner characterizing the pivot; and indicating that the query is to at least partially define an aspect based upon the pivot and the refiner.

EXAMPLE 16

The method according to example 15, further comprising: assigning lexical tags to elements in the query; comparing the lexical tags to a predefined pattern; and identifying the pivot and the refiner based upon the comparing of the lexical tags to the predefined pattern.

EXAMPLE 17

The method according to any of examples 12-16, wherein constructing the computer-implemented graph comprises clustering queries in the exploratory search sessions, each cluster defines a respective aspect represented by a node in the computer-implemented graph.

EXAMPLE 18

The method according to any of examples 12-17, further comprising: receiving a query; identifying a node in the computer-implemented graph responsive to receipt of the query, an aspect represented by the node at least partially defined by the query; and outputting a suggested query based upon the identifying of the node in the computer-implemented graph.

EXAMPLE 19

The method according to example 18, further comprising: identifying another node in the computer-implemented graph based upon the identifying of the node in the computer-implemented graph, the another node representative of another aspect, the another aspect at least partially defined by the suggested query; and outputting the suggested query responsive to identifying the another node in the computer-implemented graph.

EXAMPLE 20

A computer-readable medium comprising instructions that, when executed by a processor, cause the processor to perform acts comprising: receiving a query; identifying a node in a computer-implemented graph responsive to receipt of the query, the node representative of an aspect that is at least partially defined by the query; identifying another node in the computer-implemented graph based upon the node, the another node representative of another aspect; and outputting another query as a suggestion based upon the identifying of the another node in the computer-implemented graph.

EXAMPLE 21

Figure 12:
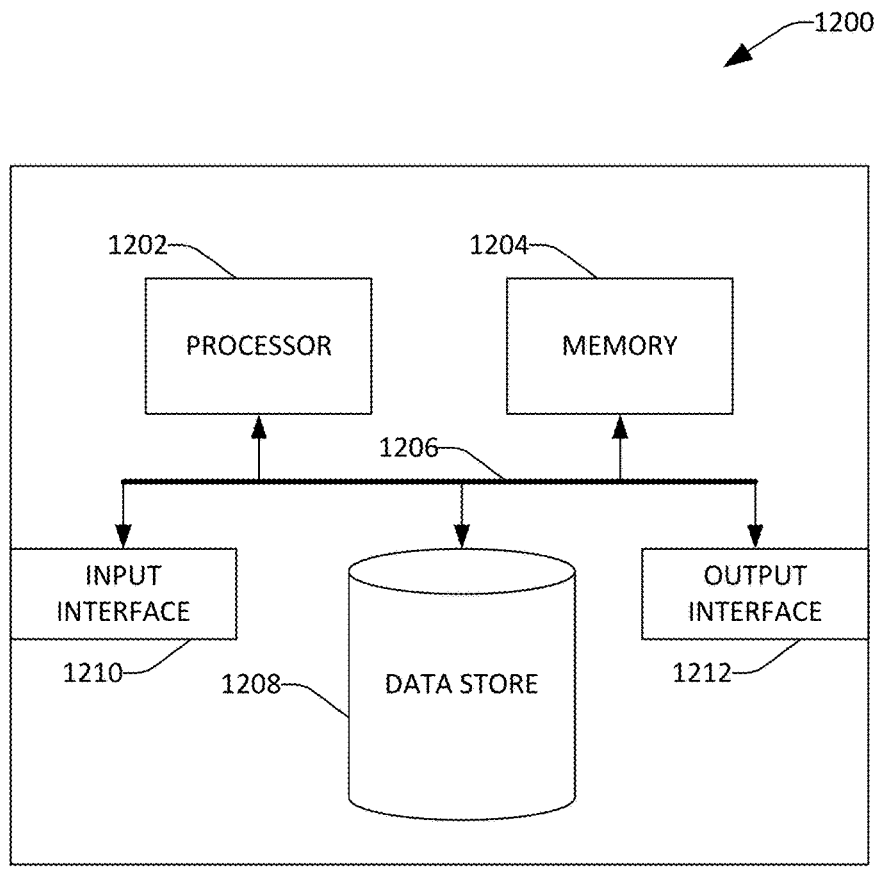
FIG. 12 is an exemplary computing system.

A computing system, comprising: means for identifying exploratory search sessions in search logs of a search engine, an exploratory search session comprising a plurality of queries set forth to obtain information about topics or to complete tasks; means for constructing a computer-implemented graph based upon the exploratory search sessions, wherein the means for constructing the computer-implemented graph comprises: means for identifying nodes that are representative of aspects, an aspect being a sub-topic of a topic or a sub-task of a task, an aspect defined by at least one query in the exploratory search logs; and means for coupling nodes with edges that are representative of relationships between the aspects, an edge that connects a first node with a second node representative of a likelihood that a searcher, when provided with a first aspect represented by the first node, will choose to perform a second aspect represented by the second node Referring now to FIG. 12, a high-level illustration of an exemplary computing device 1200 that can be used in accordance with the systems and methodologies disclosed herein is illustrated. For instance, the computing device 1200 may be used in a system that constructs the computer-implemented graph 114. By way of another example, the computing device 1200 can be used in a system that outputs exploratory suggestions based upon the computer-implemented graph 114. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store the computer-implemented graph 114, search sessions, etc.

The computing device 1200 additionally includes a data store 1208 that is accessible by the processor 1202 by way of the system bus 1206. The data store 1208 may include executable instructions, the computer-implemented graph 114, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   a processor; and
   memory that comprises instructions that, when executed by the processor, cause the processor to perform acts comprising:
   constructing a computer-implemented graph based upon search logs of a search engine, the computer-implemented graph comprises:
      a first node that is representative of a first sub-task of a task that includes multiple sub-tasks that collectively make up the task, the first node comprises a first plurality of queries that define the first sub-task, wherein a first query is included in the first plurality of queries;
      a second node that is representative of a second sub-task of the task, the second node comprises a second plurality of queries that defines the second sub-task that is represented by the second node, wherein a second query is included in the second plurality of queries, and further wherein completion of the task includes completion of the first sub-task and the second sub-task; and
      a weighted edge that connects the first node and the second node, a weight assigned to the weighted edge is indicative of a likelihood that a searcher will transition from the first sub-task represented by the first node to the second sub-task represented by the second node when completing the task;
   subsequent to constructing the computer-implement graph, receiving the first query from a client computing device;
   identifying that the first node includes the first query based upon a search over the computer-implemented graph for the first query;
   responsive to identifying that the first node includes the first query, selecting the second node based upon the weight assigned to the edge that connects the first node and the second node; and
   transmitting the second query to the client computing device as a suggested query responsive to selecting the second node.

2. The computing system of claim 1, wherein constructing the computer-implemented graph comprises:
   identifying exploratory search sessions in the search logs, the exploratory search sessions being search sessions where searchers are completing tasks that include sub-tasks, wherein the computer-implemented graph is constructed based upon the identified exploratory search sessions.

3. The computing system of claim 1, wherein constructing the computer-implemented graph comprises:
   identifying entities in queries of the search logs, wherein the computer-implemented graph is constructed based upon the identified entities.

4. The computing system of claim 1, wherein constructing the computer-implemented graph comprises:
   identifying term collocations in queries in the search logs, a term collocation being a sequence of terms that occur more often than would be expected by chance, wherein the computer-implemented graph is constructed based upon the identified term collocations.

5. The computing system of claim 1, wherein constructing the computer-implemented graph comprises:
   identifying prepositions in queries in the search logs, wherein the computer-implemented graph is constructed based upon the identified prepositions.

6. The computing system of claim 1, wherein constructing the computer-implemented graph comprises:
   identifying term patterns in queries in the search logs, wherein the computer-implemented graph is constructed based upon the identified term patterns.

7. The computing system of claim 1, wherein constructing the computer-implemented graph comprises:
   grouping queries in the search logs into a plurality of query groups, each query group defines a respective sub-task.

8. The computing system of claim 1, wherein constructing the computer-implemented graph comprises:
   computing weights to assign to edges in the graph based upon the search logs, wherein the computer-implemented graph is constructed based upon the weights.

9. The computing system of claim 1, wherein the second query is transmitted to the client computing device due to the second query being a most frequently issued query in the second plurality of queries.

10. A method executed by a processor of a computing device, the method comprising:
    receiving a first query from a client computing device that is in network communication with the computing device;
    responsive to receiving the first query, conducting a search for the first query over a computer-implemented graph, wherein the computer-implemented graph is constructed based upon search logs of a search engine, and further wherein the computer-implemented graph comprises:
       a first node that is representative of a first sub-task of a task that includes multiple sub-tasks that collectively make up the task, the first node comprises a first plurality of queries that includes the first query, wherein the first plurality of queries defines the first sub-task of the task;
       a second node that is representative of a second sub-task of the task, the second node comprises a second plurality of queries that includes a second query, wherein the second plurality of queries define the second sub-task of the task, wherein completion of the task includes completion of the first sub-task and completion of the second sub-task; and
       an edge that connects the first node with the second node, wherein the edge is assigned a weight that is representative of a likelihood that a searcher will transition from completing the first sub-task to completing the second sub-task;
    identifying that the first node includes the first query received from the client computing device based upon the search for the first query;
    responsive to identifying the first node, selecting the second node based upon the weight assigned to the edge that connects the first node with the second node; and responsive to selecting the second node, returning the second query to the client computing device as a suggested query.

11. The method of claim 10, further comprising:
constructing the computer-implemented graph, wherein constructing the computer-implemented graph comprises identifying exploratory search sessions in the search logs, and further wherein identifying the exploratory search sessions comprises:
identifying a search session with at least a predefined threshold number of queries therein; and
identifying the exploratory search session based upon identifying the search sessions with the at least the predefined threshold number of queries therein, wherein the exploratory search session comprises the first query and the second query.

12. The method of claim 11, wherein constructing the computer-implemented graph comprises:
identifying a pivot in the first query in the exploratory search session, the pivot being an entity or a term collocation, the term collocation being a sequence of terms that occur more often than would be expected by chance;
identifying a refiner in the first query, the refiner characterizing the pivot; and
indicating that the first query is to at least partially define the first sub-task based upon the pivot and the refiner.

13. The method of claim 12, wherein constructing the computer-implemented graph further comprises:
assigning lexical tags to elements in the first query;
comparing the lexical tags to a predefined pattern; and
identifying the pivot and the refiner based upon the comparing of the lexical tags to the predefined pattern.

14. The method of claim 11, wherein constructing the computer-implemented graph comprises clustering queries in exploratory search sessions, wherein a first cluster comprises the first plurality of queries and a second cluster comprises the second plurality of queries.

15. The method of claim 10, further comprising:
identifying a third node in the computer-implemented graph based upon the third node being connected to the first node by a second edge in the computer-implemented graph, the third node representative of a third sub-task, the third sub-task at least partially defined by a third plurality of queries;
selecting the third node based upon the first node being connected to the third node in the computer-implemented graph; and
returning a third query in the third plurality of queries to the client computing device as another suggested query based upon the third node including the third query.

16. A computer-readable storage medium comprising instructions that, when executed by a processor, cause the processor to perform acts comprising:
receiving a query from a client computing device;
identifying a node in a computer-implemented graph responsive to receipt of the query, wherein the node comprises a first plurality of queries, the first plurality of queries incudes the query, wherein the node is representative of a sub-task of a task, the sub- task is defined by the plurality of queries, and further wherein the task includes several sub-tasks that make up the task;
identifying a second node in the computer-implemented graph based upon a weight assigned to an edge that couples the node to the second node, the second node representative of a second sub-task of the task, the weight is indicative of a probability that a searcher will transition from the sub-task to the second sub-task when completing the task, wherein the second node includes a second plurality of queries that define the second sub-task, and further wherein the second plurality of queries includes a second query; and
transmitting the second query as a query suggestion to the client computing device responsive to identifying the second node in the computer-implemented graph based upon the weight assigned to the edge.

17. The computer-readable storage medium of claim 16, further comprising constructing the computer-implemented graph based upon the search logs of a search engine, wherein the query is submitted to the search engine.

18. The computer-readable storage medium of claim 17, wherein constructing the computer-implemented graph comprises identifying exploratory search sessions in the search logs of the search engine, wherein the exploratory search sessions each represent completion of a respective task that includes multiple sub-tasks.

19. The computer-readable storage medium of claim 16, wherein the second query is transmitted as the query suggestion based upon the second query being a most frequently issued query by users of a search engine from amongst the second plurality of queries included in the second node.

20. The computer-readable storage medium of claim 16, wherein the edge is a directed edge from the first node to the second node.

* * * * *